United States Patent [19]
Nitto et al.

[11] Patent Number: 5,179,268
[45] Date of Patent: Jan. 12, 1993

[54] APPARATUS FOR DETECTING INCLINATION OF AN OPTICAL CARD

[75] Inventors: Kouji Nitto, Takatsuki; Yoshihito Koshiba, Kyoto; Kazuo Tsuboi, Takatsuki; Keiichi Tsutsui, Ibaraki; Koji Sogo, Takatsuki, all of Japan

[73] Assignee: Omron Tateisi Electronic Co., Kyoto, Japan

[21] Appl. No.: 674,308

[22] Filed: Mar. 25, 1991

Related U.S. Application Data

[63] Continuation of Ser. No. 221,092, Jul. 19, 1988, abandoned.

[30] Foreign Application Priority Data

| Jul. 22, 1987 | [JP] | Japan | 62-184505 |
| Aug. 8, 1987 | [JP] | Japan | 62-198963 |
| Oct. 1, 1987 | [JP] | Japan | 62-150605[U] |
| Oct. 8, 1987 | [JP] | Japan | 62-154900[U] |

[51] Int. Cl.$^5$ ............................ G06K 7/10; G11B 7/09
[52] U.S. Cl. ................................ 235/454; 235/476; 235/479; 369/44.26
[58] Field of Search ............ 235/454, 456, 475, 476, 235/470, 479, 480, 485; 369/44.26, 44.11, 44.42, 44.34, 44.27

[56] References Cited

U.S. PATENT DOCUMENTS

| 4,006,293 | 2/1977 | Bouwhuis et al. | 369/44.42 |
| 4,051,527 | 9/1990 | Braat | 369/44.42 |
| 4,057,833 | 11/1977 | Braat | 369/44.42 |
| 4,588,882 | 5/1986 | Buxton | 235/491 |
| 4,652,730 | 3/1987 | Marshall | 235/456 |
| 4,692,603 | 9/1987 | Brass et al. | 235/454 |
| 4,774,400 | 9/1988 | Kimura | 235/454 |
| 4,777,356 | 10/1988 | Toyota et al. | 235/454 |
| 4,800,546 | 1/1989 | Shikichi et al. | 235/479 |
| 4,831,243 | 5/1989 | Enari et al. | 235/480 |
| 4,855,981 | 8/1989 | Kimura et al. | 369/44 |
| 5,004,898 | 4/1991 | Ihsikawa et al. | 235/475 |

FOREIGN PATENT DOCUMENTS

| 164071 | 12/1985 | European Pat. Off. |
| 200434 | 12/1986 | European Pat. Off. |
| 57-199903 | 12/1982 | Japan |
| 57-199904 | 12/1982 | Japan |
| 60-170067 | 9/1985 | Japan |
| 61-67184 | 4/1986 | Japan |

*Primary Examiner*—Robert Weinhardt
*Attorney, Agent, or Firm*—Dickstein, Shapiro & Morin

[57] ABSTRACT

The present invention relates to an optical card reader that detects any relative inclination of the card by measuring the relative motion of the optical tracks themselves. The optical card reader comprises a card holding portion, an optical head having the ability follow data tracks on the optical card, and a detector that measures the angle of inclination of the optical card from a tracking signal generated from a one-dimensional relative movement of the card holder and the optical card.

6 Claims, 13 Drawing Sheets

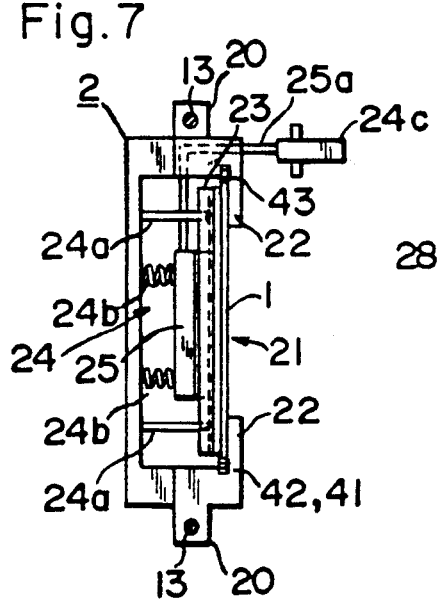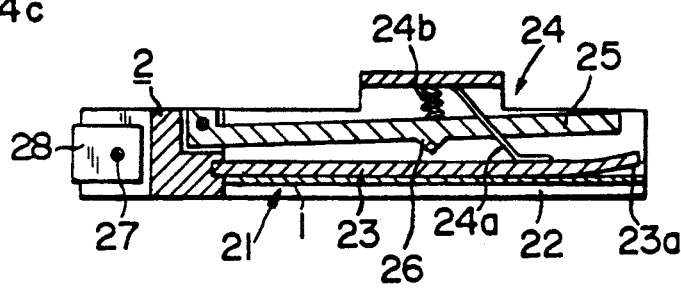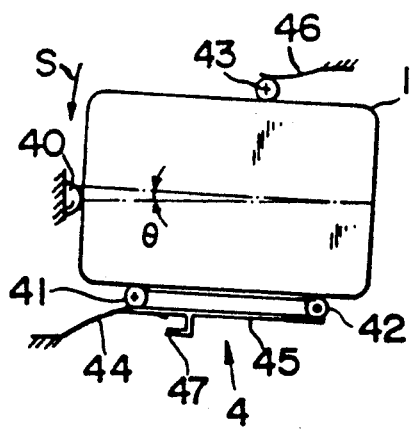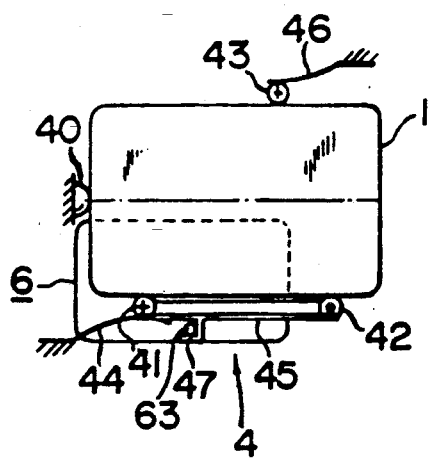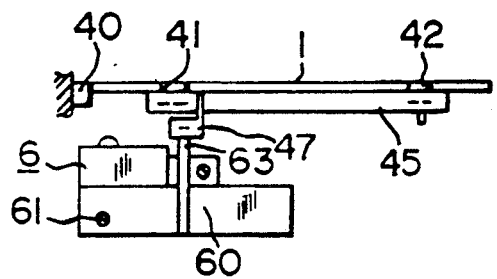

APPARATUS FOR DETECTING INCLINATION OF AN OPTICAL CARD

This is a continuation of application Ser. No. 221,092, filed Jul. 19, 1988, now abandoned.

BACKGROUND OF THE INVENTION

1. Field of the Invention

The present invention relates to an optical card processing apparatus for performing both of or either one of the recording (writing) and the playing-back (reading) of information onto and/or from a card-shaped recording medium (hereinafter, referred to as an optical card) on which information can be optically recorded with use of a light beam and, more particularly, to an apparatus for detecting an inclination of an optical card set on a card holder at the time when recording or reading the information.

The optical card is used, for example, as a recording card of personal medical information, ID card of banks, middle-scale data base or the like.

The invention also relates to a tracking error detecting apparatus in which when information is recorded onto and/or read out of an optical card, a light beam is irradiated onto tracks of the optical card, thereby detecting a tracking error from the reflected light.

2. Description of the Prior Art

In a conventional optical card processing apparatus, as shown in FIG. 24, a holder 91 having a card holding portion on the upper surface thereof is supported by guide rods 93 so as to reciprocate, the holder 91 is reciprocated through a belt 92 by a drive motor 94 which forwardly and reversely rotates, and an optical head 95 to perform both of or either one of the writing and the reading of information onto/from an optical card 1 is provided over the holder 91. The optical head 95 is arranged so as to face the recording track of the optical card 1 and is moved relatively to the card 1, thereby performing the recording and/or reproducing processes of the information.

In the foregoing optical card processing apparatus, when the optical card 1 is set on the holder 91, there is a case where the optical card 1 is obliquely held so that the moving direction of the holder 91 and the direction of the information recording track of the optical card 1 do not coincide with each other. Thus the erroneous tracking operation occurs.

On the other hand, if the optical card 1 is not highly precisely manufactured, a similar problem also occurs. For instance, when the direction of the information recording track is not parallel with the side edge of the optical card 1 and is inclined, even if the optical card 1 has been correctly set on the holder 91, the direction of the information recording track does not coincide with the moving direction of the holder 91.

To prevent such a drawback, the holding position of the optical card 1 needs to be corrected. For this purpose, it is necessary to detect a correction amount, namely, an angle of inclination of the information recording track to the moving direction of the card (hereinafter, simply referred to as an inclination angle of the optical card). However, a special optical system or the like to detect the inclination angle needs to be assembled in the apparatus, causing a problem such that the structure of the apparatus becomes complicated and is enlarged.

On the other hand, as shown in FIG. 25, a tracking error detecting apparatus has a light projecting optical system which is constructed in a manner such that a light beam irradiated from a light projecting source 81 such as a light emitting diode is converted into a parallel light beam by a collimator lens 82, and the parallel light beam is converged by a condenser lens 83, thereby forming a light spot onto the information recording/recorded portion of the optical card 1. The reflected light of the light spot passes through a light receiving optical system consisting of the condenser lens 83, a reflecting mirror 84, an image forming lens 85 and the like and is led to a photo detector 86. Thus, an image of the surface of the information recording/recorded portion is formed onto the photo detector 86.

The optical card 1 is constructed by forming an information recording/recorded layer 15 on a base plate 14 and by further forming a transparent protective layer 15A on the layer 15. As will be explained hereinlater with reference to FIG. 1, a number of pits 19 are formed in a line on each of a number of information recording tracks 17 along track guides 18, respectively, thereby recording information onto those tracks.

The track guides 18 are previously formed in the whole area in the longitudinal direction of the information recording portion and their light reflectances are generally lower than those of the other portions.

FIG. 26 shows the relation between an image of the optical card 1 formed and the photo detector 86. In the diagram, reference numerals 18 and 19 also represent images of the track guides and pits.

The photo detector 86 consists of a photo diode and has two-split square light receiving portions 86A and 86B. Each of the light receiving portions 86A and 86B is arranged so that one side is adjacent to each other. Photo sensing signals of the light receiving portions 86A and 86B are sent to a differentiating circuit 88 through amplifiers 87A and 87B, respectively. Therefore, when the image of the track guide is located on a boundary line of the light receiving portions 86A and 86B in the photo detector 86, the levels of both of the photo sensing signals coincide. However, when the image of the track guide is deviated in either one direction from the boundary line, a difference occurs between the levels of those photo sensing signals, so that the differentiating circuit 88 outputs a track error signal.

FIG. 27 shows a track error signal which is generated when the photo detector 86 traversed an image of a plurality of track guides in the direction perpendicular to their longitudinal direction. In the diagram, d indicates a distance between adjacent track guides 18. $R_0$ represents a dynamic range of the track error signal. In the tracking control, a tracking error amount is detected by use of the linear portion of the signal in the dynamic range $R_0$. The condenser lens 83 is driven by an actuator so that this error amount is set to zero.

However, in the foregoing tracking error detecting apparatus, since a track error signal is generated when the image of the track guides traverses the boundary line of the light receiving portions 86A and 86B which is parallel with the image of the track guides, the dynamic range $R_0$ of the track error signal is determined by a width of each of the track guides 18. Therefore, the dynamic range $R_0$ larger than the width of the track guide 18 cannot be obtained in principle. Thus, the dynamic range $R_0$ of the track error signal is small and a controllable region is extremely narrowed. This results in that even when a slight tracking error occurs, a light spot is deviated from the controllable region. In particular, this apparatus is weak to a shock during the operation. In addition, since the dynamic range $R_0$ is narrower than the distance between the track guides 18, the tracking pull-in operation (pulling into controllable region) at the start of the tracking control and the tracking pull-in operation in the track jumping operation cannot be easily performed and become uncertain, and the like. There are many practical problems as mentioned above.

SUMMARY OF THE INVENTION

The present invention is made by paying an attention to the foregoing problems and it is an object of the invention to provide an apparatus for detecting an inclination of an optical card in which the inclination of an optical card can be detected without adding any special optical system or the like.

Another object of the invention is to provide a novel tracking error detecting apparatus in which by devising a shape of each light receiving portion in a photo detector, a large dynamic range of a tracking error signal is obtained, thereby making the apparatus strong to a shock during the operation, and at the same time, the tracking pull-in operations at the start of the tracking control and in the track jumping operation can be easily certainly realized.

To accomplish this object, according to the present invention, in an optical card processing apparatus in which while an optical head and an optical card are being relatively moved, information is recorded (written) onto or reproduced (read) from information recording/recorded tracks, and the optical head is moved in the direction perpendicular to the foregoing relative moving direction by a tracking signal, thereby allowing the optical head to follow the information recording/recorded tracks, by monitoring a change amount of the tracking signal, an angle of inclination of the optical card to the relative moving direction is detected.

Prior to recording or reproducing information onto/from an optical card, the optical head and optical card are relatively moved, thereby allowing a tracking signal to be output from the optical head. By taking out the tracking signal and monitoring a change amount thereof, the inclination angle of the optical card to the relative moving direction of the optical head is detected. If the inclination angle of the optical card can be detected, the holding position of the optical card can be corrected on the basis of this detection value. The scanning direction of the optical head can be made coincide with the direction of the information recording/recorded tracks of the optical card.

As mentioned above, according to the invention, by monitoring a change amount of the tracking signal, the inclination angle of the optical card to the scanning direction of the optical head is detected. Therefore, the inclination of the optical card can be detected without assembling any special optical system or the like into the apparatus. Consequently, there is no fear of complication and enlargement of the structure of the apparatus and a cheap optical card inclination correcting mechanism can be realized. Thus, a small actuator of a narrow movable range can be used as an actuator of the optical system in the optical head. The tracking performance is improved. The reduction of the cost and high performance of the optical card processing apparatus can be realized.

To accomplish the foregoing object, according to the present invention, in an optical card processing apparatus in which by supplying a current to a lens actuator, an object lens of an optical head is adjusted, thereby executing the tracking and focusing servo operations and recording (writing) or reproducing (reading) information onto/from an optical card, wherein the lens actuator is provided with a current detecting section to detect the current flowing through the lens actuator upon execution of the servo operations.

When the tracking and focusing servo operations are executed by moving the objective lens of the optical head by supplying a current to the lens actuator, the current detecting section detects the current flowing through the lens actuator and decides the position of the objective lens on the basis of the detection value. If the optical card is inclined, the position of the objective lens is deviated. Therefore, the inclination angle of the optical card can be determined on the basis of the amount of deviation.

As mentioned above, according to the invention, in the tracking and focusing servo operations, a current flowing through the lens actuator is detected by the current detecting section, so that the position of the objective lens of the optical head can be determined from the current value. Therefore, if the optical card is inclined, the position of the objective lens is deviated upon tracking servo operation. Therefore, the inclination angle of the optical card can be detected on the basis of this deviation amount. Accordingly, the inclination of the optical card can be detected without assembling any special optical system or the like into the apparatus. There is no fear of complication and enlargement of the structure of the apparatus. A cheap optical card inclination detecting mechanism can be realized. In addition, since the position of the objective lens of the optical head can be detected, it is possible to confirm whether the objective lens is located at the optimum position of the lens stroke or not.

To accomplish above object, according to the invention, in an optical card processing apparatus in which an optical card having a plurality of track guides along a plurality of information recording/recorded tracks is relatively moved to an optical head and this optical head is driven so as to follow the information recording/recorded tracks by a track servo mechanism, thereby recording (writing) or reproducing (reading) information, this optical card processing apparatus comprises: means for generating an output signal which changes every time the optical head crosses the track guide by relatively moving the optical card without making the track servo mechanism operative; means for shaping the waveform of the output signal and producing pulses having the frequency corresponding to the inclination angle of the optical card; and means for counting the pulses and converting the count value into the inclination angle of the optical card.

Prior to recording or reproducing information onto/from an optical card, the optical card is relatively moved without making the track servo mechanism operative. If the relative moving direction of the optical card does not coincide with the direction of the information recording/recorded tracks, the optical head crosses the track guides once or a plural times during the movement. Each time the optical head crosses the track guide, a change occurs in an output signal of the track servo mechanism. The waveform of this output signal is shaped and the pulses of the frequency corresponding to the inclination angle of the optical card are produced. Further, the pulses indicative of this inclination are counted and the count value is converted into the inclination angle of the optical card. When the inclination angle is obtained, the holding position of the optical card is corrected on the basis of the value of this angle, thereby enabling the relative moving direction of the optical card to the optical head to coincide with the direction of the information recording/recorded tracks.

As mentioned above, according to the invention, the optical card is relatively moved without making the track servo mechanism operative and the number of crossing times of the optical head with the track guides is counted. This number of crossing times can be detected by using the optical head, so that the inclination of the optical card can be detected without assembling any special optical system or the like into the apparatus. Consequently, there is no fear of complication and enlargement of the structure of the apparatus and the cheap optical card inclination correcting mechanism can be realized. Thus, a small actuator of a narrow movable range can be used as an actuator of the optical system in the optical head. The tracking performance is improved and the reduction of the cost and the high performance of the optical card processing apparatus can be accomplished.

To accomplish the above mentioned object, according to the invention, a tracking error detecting apparatus comprises: a photo detector having at least two light receiving portions to detect the reflected light from an optical card; and an optical system for converging the reflected light from the optical card onto the photo detector and forming an image. The photo detector constructed in a manner such that at least one side of the outer shape of each of the light receiving portions is positioned obliquely to the image of the track guides which is formed onto the photo detector.

Since the photo detector is constructed such that at least one side of the outer shape of each light receiving portion is obliquely positioned to the image of the track guides which is formed onto the photo detector, the dynamic range of the track error signal can be set to a relatively large value in comparison to the distance between adjacent track guides. Therefore, a detection width of the tracking error is wide and the apparatus becomes strong to a shock during the operation. In addition, the tracking pull-in operations at the start of the tracking control and in the track jumping operation can be easily certainly executed.

BRIEF DESCRIPTION OF THE DRAWINGS

FIG. 7 is a front view showing the structure of the card holding mechanism;

FIG. 8 is a cross sectional view showing the operation of the card holding mechanism;

FIGS. 9 and 10 are plan views for explaining a construction of a card inclination correcting mechanism, respectively;

FIG. 11 is a front view of the card inclination correcting mechanism;

FIG. 18 is an explanatory diagram showing a whole arrangement of the optical card inclination detecting apparatus;

FIG. 19 is a waveform diagram showing signal waveforms in the state in which the optical card is inclined;

FIG. 20 is an explanatory diagram showing a characteristic portion of the tracking error detecting apparatus;

FIG. 21 is a waveform explanatory diagram showing a track error signal which is generated when an image of a plurality of track guides continuously crosses a photo detector in FIG. 20;

FIG. 22 is an explanatory diagram showing the principle of the generation of the track error signal;

FIG. 23 is an explanatory diagram showing a characteristic portion of another embodiment;

DETAILED DESCRIPTION OF THE PREFERRED EMBODIMENTS

Figure 1A:
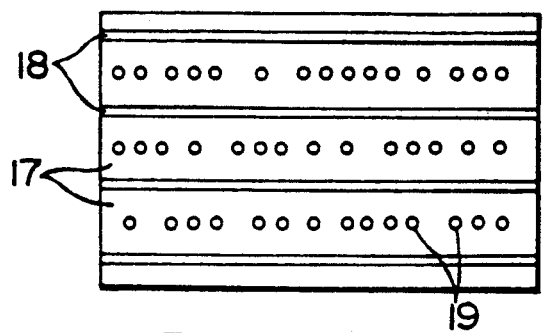
FIGS. 1A and 1B show a whole optical card and an enlarged part of this card.
Figure 1B:
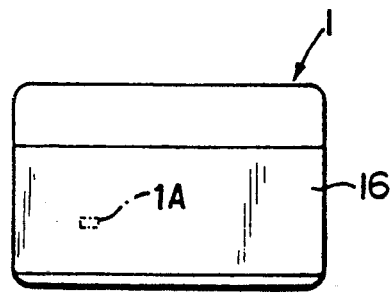

FIG. 1 is a diagram showing a whole optical card from and onto which data is read (play-back) or written (recorded) by an optical card processing apparatus and also shows a partial enlarged diagram of this card. The optical cards include not only the card to/from which information can be optically read/written but also the card to/from which information can be magnetooptically read/written. A number of information recorded or recording tracks 17 specified by the track guides 18 are formed in an information recording portion 16 of the optical card 1. Bits indicative of information are recorded on the tracks 17 in a form of pits 19 (in the case of optically recordable and reproducible card). The track guides 18 are provided for allowing an optical head for writing and reading to trace the tracks (for the purpose of what is called a tracking control).

Figure 2:
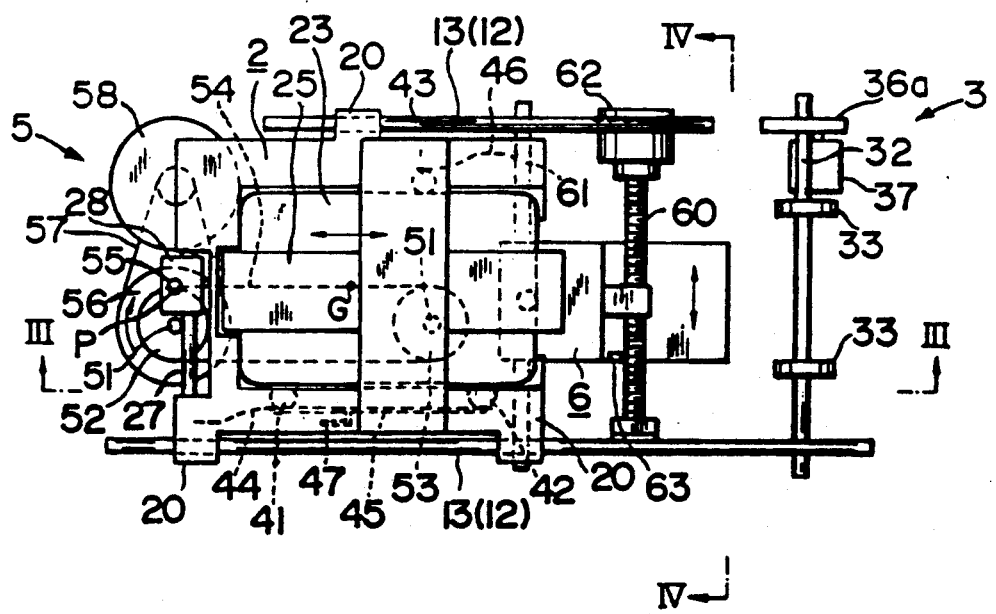
FIG. 2 is a plan view showing a schematic arrangement of a card processing apparatus according to an embodiment of the invention.
Figure 3:
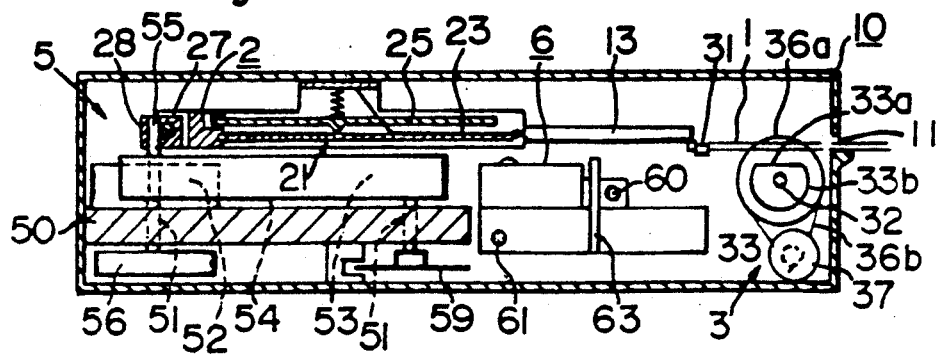
FIG. 3 is a cross sectional view taken along the line III—III in FIG. 2.
Figure 4:
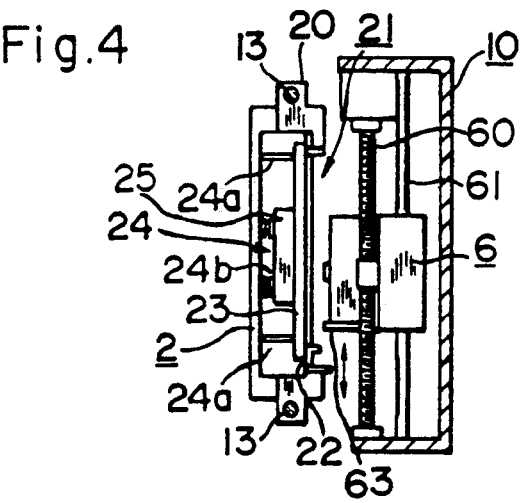
FIG. 4 is a cross sectional view taken along the line IV—IV in FIG. 2.
Figure 5:
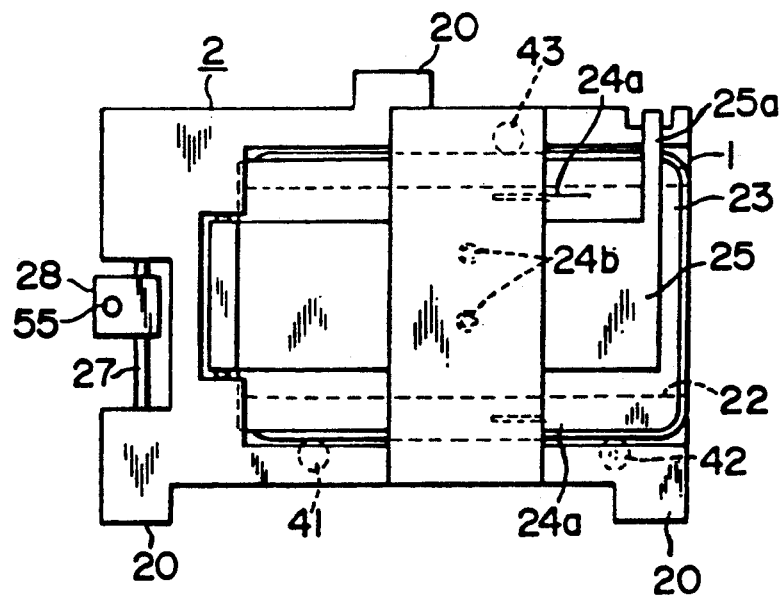
FIG. 5 is a plan view of a holder showing an external view of a card holding mechanism.
Figure 6:
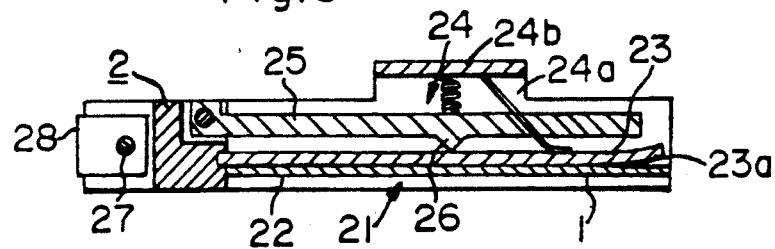
FIG. 6 is a cross sectional view showing a structure of the card holding mechanism.

FIGS. 2 to 4 show an optical card processing apparatus according to an embodiment of the invention.

In the optical card processing apparatus, a guiding mechanism 12 is constructed by arranging two guide rods 13 in parallel in a casing 10 having a card inserting port 11. A card holder 2 is supported by the guiding mechanism 12 so as to be movable along the guide rods 13. An optical head 6 is arranged on the card inserting side in correspondence to the lower portion of the holder moving path and a card transfer mechanism 5 is arranged on the rear side, respectively.

The holder 2 is slidably supported by the guide rods 13 through bearings 20 attached to both sides of the holder 2. A card holding mechanism 21 is arranged below the holder 2 and is positioned in height so as to correspond to the location of the card inserting port 11 of the casing 10.

As illustrated in FIGS. 4 to 8, the card holding mechanism 21 is constructed in a manner such that a flange 22 which projects inwardly is formed on the lower portion of the opposite side wall of the holder 2, thereby supporting both side portions of the optical card 1. A card pressing plate 23 whose both side portions face the flange 22 is arranged between the side walls. Pressurizing means 24 which can adjust the intensity of the pressing force is provided for the card pressing plate 23. A portion 23a on the card inserting port side of the card pressing plate 23 is slightly bent so as to keep a gap between the plate 23 and the flange 22. On the other hand, the edge portion on the opposite side of the card pressing plate 23 is loosely fitted into a concave portion formed in the holder 2.

The pressurizing means 24 comprises springs 24a and 24b and a lever 25. The springs 24a are interposed between both side portions of the card pressing plate 23 and a part of the holder 2 and generate a relatively weak pressing force. The other spring 24b is attached between the lever 25 and a part of the holder 2 and has a pressing force stronger than that of the spring 24a. One end of the lever 25 is pivotally supported to the rear side of the holder 2. A pressing projection 26 which comes into contact with the central portion of the card pressing plate 23 is formed on the lower surface of the lever 25. At the other edge of the lever 25, an arm 25a is extended toward the side and penetrates the notch portion of the holder 2 and further extends downwardly. The lever 25 is pushed up through the arm 25a against the spring force of the spring 24b by an operating mechanism 24c consisting of a cam, solenoid, and the like.

Returning to FIGS. 2 and 3, in the card inserting port 11, there are provided a detector 31 to detect the inserted optical card 1 and a card loading/ejecting mechanism 3 for automatically carrying the optical card 1 into the card holding mechanism 21 of the holder 2 in response to a detection signal of the detector 31 and ejecting the card 1 from the holding mechanism 21.

The card loading/ejecting mechanism 3 is arranged below the height position of the holder 2. A pair of right and left loading cams 33 are attached to a rotary shaft 32 which is rotatably supported to the casing 10. The rotary shaft 32 is driven by a loading motor 37 through a speed reducing mechanism consisting of a pulley 36a and a belt 36b. The loading cams 33 are the almost semicircular cams made of a rubber material. When flat cam surfaces 33a of the cams 33 are horizontally located over the rotary shaft 32, the flat cam surfaces 33a approach the lower surface portion of the holder 2 in a contactless state. When the loading cams 33 rotate by the operation of the loading motor 37, circular cam surfaces 33b of the cams 33 come into contact with the optical card 1, thereby carrying the card 1 to a predetermined position of the card holder 2. Then, the flat cam surfaces 33a again face the card 1 and the motor 37 stops. The optical card 1 is ejected out of the apparatus by rotating the cams 33 in the direction opposite to that mentioned above.

The holder 2 has a card inclination correcting mechanism 4 to make the direction of the information recorded or recording tracks 17 of the optical card 1 coincide with the moving direction of the holder 2 due to the card transfer mechanism 5, which will be explained in detail hereinlater.

As shown in FIG. 9, the card inclination correcting mechanism 4 is constructed in a manner such that a positioning stopper 40 is attached on the rear side of the holder 2 and at the position which faces the center in the width direction of the card 1, card guides 41, 42 and 43 each consisting of a rotatable roller (this roller is not necessarily rotatable) are arranged such that two of them (e.g., the card guides 41 and 42 in the example shown in FIG. 9) are arranged on one side of the holder 2 and the other card guide (43 in this case) is arranged at the intermediate position on the other side of the holder 2. The card guides 41 and 42 are rotatably supported to both end portions of a bar member 45. A base edge portion (corresponding to the position of the guide 42) of the bar member 45 is pivotally fixed to the holder 2. The top edge portion of the bar member 45 is urged by a spring 44 whose one end is fixed to the holder 2, thereby always pushing the card guide 41 on the top edge side toward the card side i.e. insideward than the card guide 42 on the base edge side.

The card guide 43 is attached to the top edge of a leaf spring 46 whose base edge portion is fixed to the holder 2. The card guides 41, 42 and 43 are located on the flange 2 so as to mutually sandwich the optical card 1 from both sides thereof, thereby guiding the optical card 1 on both sides thereof at three points.

As shown in FIG. 11, an operating projection member 47 which downwardly extends is formed on the top edge side of the bar member 45. On the other hand, an operating member 63 which is come into engagement with and disengagement from the inside of the operating projection member 47 is formed on the optical head 6. The inclination angle correcting mechanism of the card is constructed by the operating projection member 47 and operating member 63. With reference to FIGS. 9 and 10, in the state in which the optical card 1 is held by the holder 2 and supported by the card guides 41 to 43 at three points, an angle 0 of inclination of the optical card 1, namely, the angle between the direction of the tracks 17 of the optical card 1 and the card transfer direction is detected by an optical card inclination detecting apparatus 100 (which will be described hereinbelow). Thereafter, the optical head 6 is moved outsideward in accordance with the detection angle and the bar member 45 is moved by the operating member 63 through the projection member 47, thereby correcting the inclination of the optical card 1.

A guide rod 27 is provided on the rear side of the holder 2 so as to be perpendicular to the moving direction of the holder 2, thereby movably supporting a slide member 28. The slide member 28 is coupled with the card transfer mechanism 5 as will be explained below.

The card transfer mechanism 5 is constructed in the following manner. Two axes 51 are rotatably supported to a fixed frame 50 in the casing 10. Pulleys 52 and 53 are fixed to axes 51, respectively. An endless belt 54 is reeved around the pulleys 52 and 53. A coupling pin 55 is vertically attached to a proper position of the endless belt 54. The pin 55 is rotatably coupled with the slide member 28. A pulley 56 is fixed to the lower portion of one axis 51. The rotational force of a drive motor 58 which rotates in a single direction is transmitted to the pulley 56 through transmitting means 57 such as belt or the like. A rotary encoder 59 is attached to the other axis 51. A center G of gravity of the card holder 2 and a drive center P of the transfer mechanism 5 are arranged on the same line which is parallel with the moving direction of the holder 2 when they are seen from the plan surface (also from the side elevational view) in the case where the holder 2 moves from the card inserting side to the rear position. In this embodiment, the center of the coupling pin 55 of the slide member 28 is arranged on the line in the card transfer direction which passes through the center G of gravity of the holder 2.

The optical head 6 is slidably supported to a guide rod 61 which extends in the direction perpendicular to the moving direction of the holder 2 and fixed to the casing 10. A lead screw 60 which extends in the same direction as that of the guide rod 61 engages with the optical head 6. The lead screw 60 is driven by a head transfer motor 62 which can rotate forwardly and reversely. Therefore, when the head transfer motor 62 operates, the optical head 6 is guided by the guide rod 61 and lead screw 60 and at the same time, the optical head 60 moves in the direction perpendicular to the transfer direction of the optical card 1 by the rotation of the lead screw 60. Thus, the optical head 6 accesses a predetermined information recorded or recording track of the optical card 1.

Figure 12:
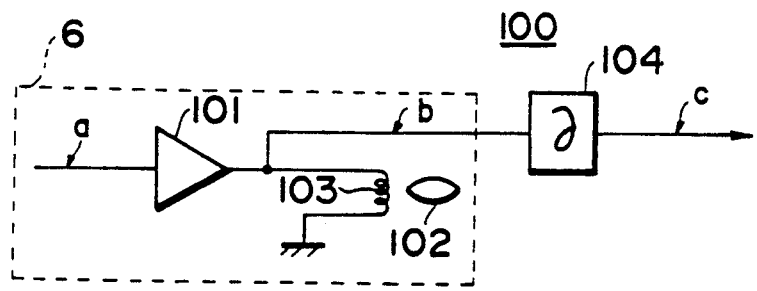
FIG. 12 is a block diagram showing an example of an optical card inclination detecting apparatus.

FIG. 12 shows an example of the optical card inclination detecting apparatus 100.

In the diagram, the portion surrounded by a broken line shows a portion included in the optical head 6 comprising a servo circuit 101, an optical system 102, and lens actuator coils 103. The optical system 102 irradiates a light beam for recording or playing-back to the optical card 1. The optical system 102 can be moved in the vertical direction (for the focusing control) and in the width direction (for the tracking control) of the optical card 1 by the actuation of the lens actuator coils 103. On the other hand, the optical system 102 has a pair of photodetectors (not shown) to receive an image of the reflected light from the optical card 1. By taking out the difference between outputs of those photodetectors, a focusing error signal and a tracking error signal a are obtained. The tracking error signal a is input to the servo circuit 101. On the basis of this input signal, the servo circuit 101 produces a tracking signal b to drive the lens actuator coils 103 (for the tracking control).

Figure 13:
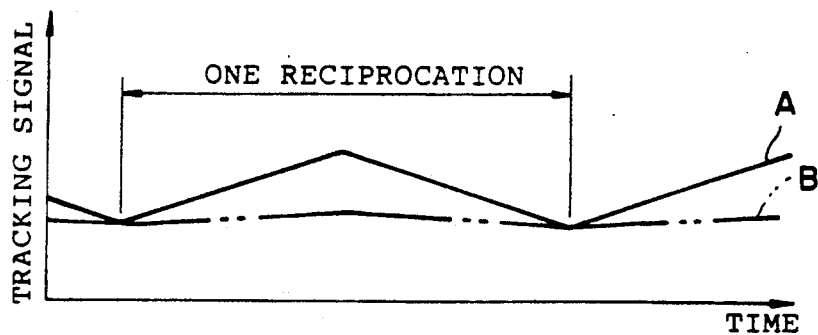
FIG. 13 is a graph showing a change in tracking signal in the inclined state of an optical card.

FIG. 13 shows a change of tracking signal in time for the period of time when the optical card 1 is reciprocated once. In the diagram, a solid line A represents a change of the tracking signal b in the case where the inclination angle $\theta$ of the optical card 1 is large. A dot-and-dash B indicates a change state of the tracking signal b when the inclination angle $\theta$ of the optical card 1 is small.

According to the optical card inclination detecting apparatus 100 in this embodiment, by monitoring the change amount of the tracking signal b (that is, the tracking signal b which is used when the tracking control is performed), the inclination angle $\theta$ of the information recorded or recording track 17 with respect to the moving direction of the optical card 1 is detected. In the case of the example of FIG. 12, the change amount of the tracking signal b is monitored by use of a differentiating circuit 104 and an angle detection signal c is output.

Figure 14:
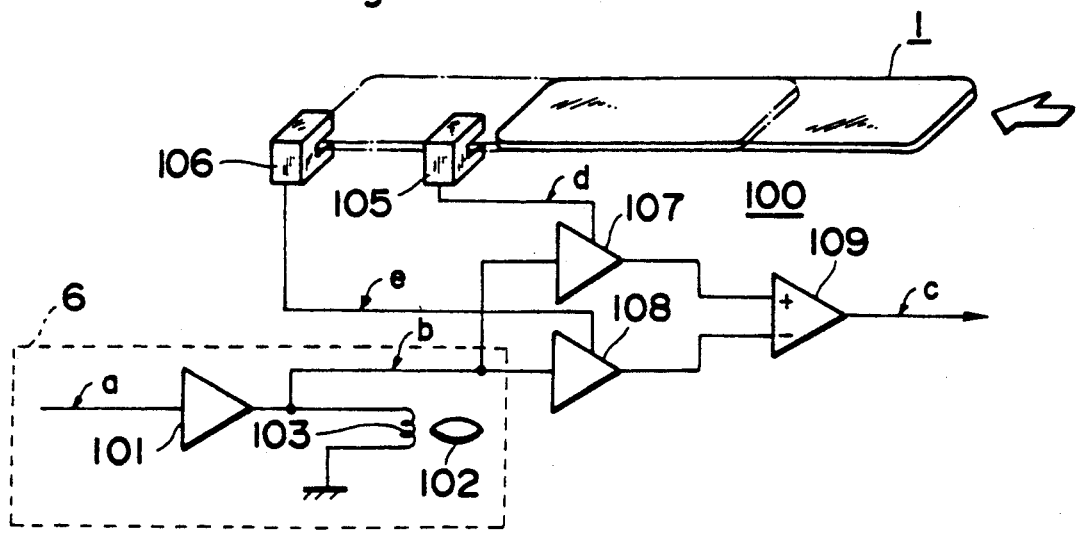
FIG. 14 is a block diagram showing another embodiment of an optical card inclination detecting apparatus.

FIG. 14 shows another embodiment of the optical card inclination detecting apparatus 100. This apparatus comprises: a pair of card detecting sensors 105 and 106; a pair of sample and hold circuits (S/H circuits) 107 and 108; and a subtracter 109. The sensors 105 and 106 are arranged along the transfer path of the optical card 1 and detect the moving optical card 1 at two different positions. The tracking signal b is input to the S/H circuits 107 and 108 and sampled and held at the input timings of card detection signals d and e from the sensors 105 and 106. The tracking signals b sampled and held by the S/H circuits 107 and 108 are given to the subtracter 109. The subtracter 109 calculates the difference between those input signals and produces the angle detection signal c.

The operation of the optical card processing apparatus will now be described.

In the card insertion standby mode, the holder 2 is located near the card inserting port 11. The loading cams 33 of the card loading/ejecting mechanism 3 are set so that the flat cam surfaces 33a face the holder 2. In the card holding mechanism 21 of the holder 2, the lever 25 is pushed up by the operating mechanism 24c, so that a weak pressing force of the springs 24a is applied to the card pressing plate 23.

In this state, when the optical card 1 is inserted into the card inserting port 11 and this insertion is detected by the detector 31, the loading motor 37 starts operate and the cams 33 rotate. The circular cam surfaces 33b come into contact with the lower surface of the inserted optical card 1. Thus, the inserted optical card 1 is automatically interposed between the flange 22 and the card pressing plate 23 of the card holding mechanism 21. Since the front edge portion 23a of the pressing plate 23 is inclined upwardly, the optical card 1 can be smoothly inserted (refer to FIG. 8).

The optical card 1 carried in the holder 2 is temporarily positioned by the card guides 41 to 43 and positioning stopper 40. However, since there is a tendency such that the inner side of the optical card 1 is pressed by the card guide 41 due to the operation of the spring 44, the inclination angle $\theta$ in a predetermined direction is forcedly given to the optical card 1 (FIG. 9).

Next, since the operating mechanism 24c in the card holding mechanism 21 releases the lever 25, a strong pressing force of the spring 24b acts on the card pressing plate 23 through the lever 25. The optical card 1 is fixed by the pressing forces of both springs 24a and 24b (refer to FIG. 6).

In the above fixing operation, since the optical card 1 is held by the weak pressing force of the spring 24a, the position of the card 1 does not deviate.

In this state, the card transfer mechanism 5 is made operative to reciprocate the optical card 1 together with the holder 2. When the tracking control is performed such that the light spot irradiated from the optical system 102 moves along the track guides 18 (the transfer operation will be described in detail hereinlater), the tracking signal b is output from the optical head 6. The tracking signal b indicates the moving distance of the optical system 102. The change amount of the tracking signal b is monitored by the optical card inclination detecting apparatus 100, so that the inclination angle θ (signal c) of the track 17 (track guide 18) for the forward moving direction (which means the direction from the card inserting port 11 to inner side of the casing 10) of the optical card 1 is detected.

After completion of the detection of the inclination angle θ, the operating mechanism 24c in the card holding mechanism 21 pushes up the lever 25, thereby releasing the strong pressing force by the spring 24b from the card pressing plate 23. Therefore, in this state, only the weak pressing force of the springs 24a acts on the card pressing plate 23.

Next, the optical head 6 moves toward the side of the operating peojection member 47 in accordance with the detected inclination angle. The operating member 63 pushes the operating projection member 47 outwardly from the inside. Thus, the optical card 1 is moved in the direction indicated by an arrow S shown in FIG. 9 by the force larger than the pressing force of the springs 24a, thereby correcting the position of the optical card 1. In this manner, the transfer direction of the optical card 1 is made coincide with the direction of the track 17 (refer to FIG. 10).

The relation between the value of the signal c and the inclination angle θ of the optical card 1 is predetermined. Therefore, by moving the operating projection member 47 (namely, the optical head 6) on the basis of the signal c, the inclination angle θ can be corrected to zero. On the other hand, since the optical head 6 is driven by the head transfer motor 62 consisting of a stepping motor through the lead screw 60, the number of drive pulses to be applied to the motor 62 to correct the inclination angle θ to zero is calculated by use of the pitch of the screw 60 and the rotational angle of the stepping motor 62 per drive pulse. When the value of the signal c is zero, in other words, when the inclination angle θ is zero, there is no need to correct the inclination of the optical card 1 by the optical head 6.

Subsequent to the optical card inclination correcting operation, the operating mechanism 24c in the card holding mechanism 21 again releases the lever 25, thereby allowing the strong pressing force of the spring 24b to act on the card pressing plate 23 through the lever 25. The optical card 1 is fixed by the pressing forces of the springs 24a and 24b. When such a fixing operation is executed, since the optical card 1 is held by the weak pressing force of the springs 24a, the position of the card 1 does not deviate.

If necessary, the holder 2 is again reciprocated and a check is made by the value of the signal c to see if the inclination angle θ of the optical card 1 has been corrected to zero or not. In accordance with the degree of correction, the foregoing correcting operation is performed and, if necessary, the card 1 is ejected out and is again inserted into the apparatus.

After the optical head 6 was returned to the original position, the card transfer mechanism 5 operates. The endless belt 54 is driven by the rotation of the drive motor 58. The coupling pin 55 attached to the belt 54 allows the holder 2 to be pulled and to be moved in the forward direction along the guide rods 13 through the slide member 28. When the coupling pin 55 reaches the outer periphery of the pulley 52, the pin 55 causes the slide member 28 to slide in the width direction of the holder 2 and is circulated by the half circle of the pulley 52 and moves to the returning side. Next, in a manner similar to the forward going operation, the coupling pin 55 returns the holder 2 in the reverse direction along the guide rods 13 through the slide member 28. Thus, the holder 2 can be reciprocated by the continuous rotation of the drive motor 58 in the single direction. When the optical card 1 forwardly moves (at this time, the recording/playing-back to/from the optical card 1 is executed), the center G of gravity of the holder 2 and the drive center P of the feeding mechanism 5 are aligned on the same line. Therefore, the yawing and pitching upon movement of the card are eliminated and a high transfer accuracy is derived. This guarantees the accurate recording and playing-back operations.

When the holder 2 forwardly moves, the tracks 17 of the optical card 1 relatively move in the track direction for the corresponding optical head 6 and information is recorded and reproduced. When the holder 2 is returned to the first position near the card inserting port 11, the head transfer motor 62 operates and the next track is accessed through the guide rod 61 and lead screw 60. The similar card transfer operation and the recording/reproducing operations associated therewith are again repetitively executed.

In the recording/reproducing operations, the loading cams 33 are held in the state in which the flat cam surfaces 33a are horizontally located and do not come into contact with the optical card 1 and card holder 2. Thus, the loading cams 33 do not become an obstacle in the movement of the holder 2 and the information can be processed at a high reliability.

Figure 15:
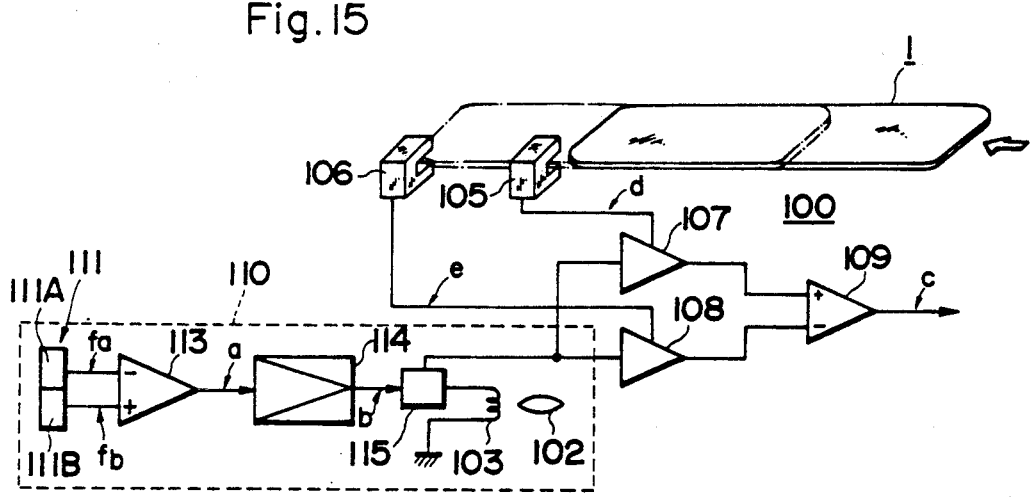
FIG. 15 is a block diagram showing further another embodiment of an optical card inclination detecting apparatus.

FIG. 15 shows still another embodiment of the optical card inclination detecting apparatus 100. In FIG. 15, the same parts and components as those shown in FIG. 14 are designated by the same reference numerals.

In the diagram, the portion surrounded by a broken line shows a tracking servo mechanism 110 provided for the optical head 6. The tracking servo mechanism 110 comprises a photo detector 111; a subtracter 113; a compensating and gain circuit 114; a lens driving mechanism (lens actuator coils) 103; and the optical system (objective lens) 102.

The photo detector 111 is assembled in the optical system of the optical head 6 and includes a pair of photo diodes 111A and 111B to receive the reflected light when a light beam for tracking or recording/reproducing was irradiated onto the information recording/recorded portion 16 of the optical card 1. The photo diodes 111A and 111B receive the reflected light and produce output signals of the levels corresponding to the amounts of lights received. These output signals are amplified by amplifiers (not shown) and thereafter, the difference between amplified outputs $f_a$ and $f_b$ is calculated by the subtracter 113, thereby forming the tracking error signal a. The tracking error signal a is input to the compensating and gain circuit 114. The circuit 114 produces the tracking signal b to move the optical system 102 in the direction which is parallel with the surface of the optical card 1 by supplying a current to the lens actuator coils 103 on the basis of this input signal.

Therefore, when the tracking servo mechanism 110 is made operative and the optical card 1 is moved together with the card holder 2, the optical head 6 follows the information recording track 17 of the optical card 1, so that information can be correctly recorded onto or reproduced from the information recording track 17.

According to the optical card inclination detecting apparatus 100 in this embodiment, a current detecting section 115 for detecting a current flowing through the lens actuator coils 103 in the tracking servo operation and obtaining the position of the optical system 102 is arranged between the compensating and gain circuit 114 and the lens actuator coils 103, and a detection current value by the current detecting section 115 is given to the pair of S/H circuits 107 and 108.

Figure 16:
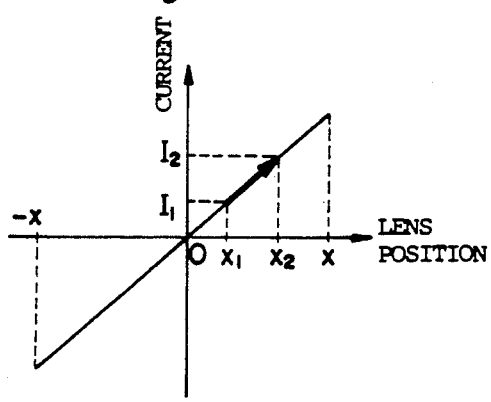
FIGS. 16 and 17 are graphs each showing the relation between the position of the objective lens and the current flowing through the lens actuator in the optical card inclination detecting apparatus shown in FIG. 15.

FIG. 16 shows the relation between the position of the lens of the optical system 102 whose lens stroke in the direction along the surface of the optical card 1 is set to 2x and the value of the current flowing through the lens actuator coils 103. It will be understood from this graph that there is the proportional relation between them and that when the lens position is moved from $x_1$ to $x_2$, the current value linearly increases from $I_1$ to $I_2$.

Since the optical system 102 follows the track guides 18 on the optical card 1, by checking the values of the current flowing through the lens actuator coils 103 at two points, the inclination of the track guides 18, that is, the inclination of the information recording tracks 17 to the moving direction of the card can be known.

For this purpose, two card detecting sensors 105 and 106 are arranged along the carrying passage of the optical card 1 and the moving optical card 1 is detected by these sensors at different two points, thereby allowing card detection signals d and e to be generated. In addition, the detection current value which is given to the S/H circuits 107 and 108 is sampled and held at the timing of the generation of the card detection signals d and e. The sampled and held current values are given to the subtracter 109, by which the difference between these input signals is calculated to produce the angle detection signal c.

In the case of the foregoing embodiment, the inclination of the optical card 1 has been detected by detecting the current flowing through the lens actuator coils 103 of the tracking servo mechanism 110. However, for example, if a current flowing through the lens actuator coils of a focusing servo mechanism is detected, a warp of the optical card 1 or a height of the optical head 6 to the optical card 1 can be checked.

Figure 17:
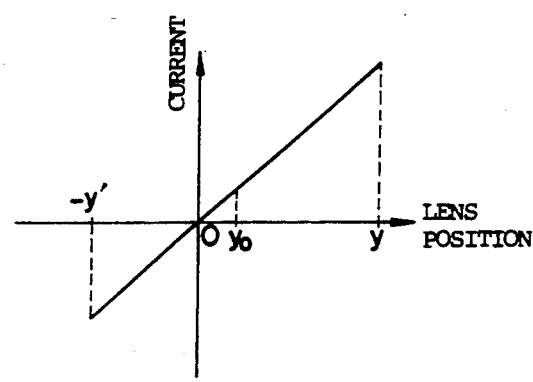

FIG. 17 shows the relation between the height position of the lens of the optical system 102 whose lens stroke in the vertical direction to the optical card 1 is set to $(y+y')$ and the value of the current flowing through the lens actuator coils of the focusing servo mechanism. It will be understood from this graph that there is the proportional relation between them and that when the lens position is vertically moved around a balanced position $y_0$ in the focusing operation as a center, the current value also linearly increases or decreases.

Figure 18:
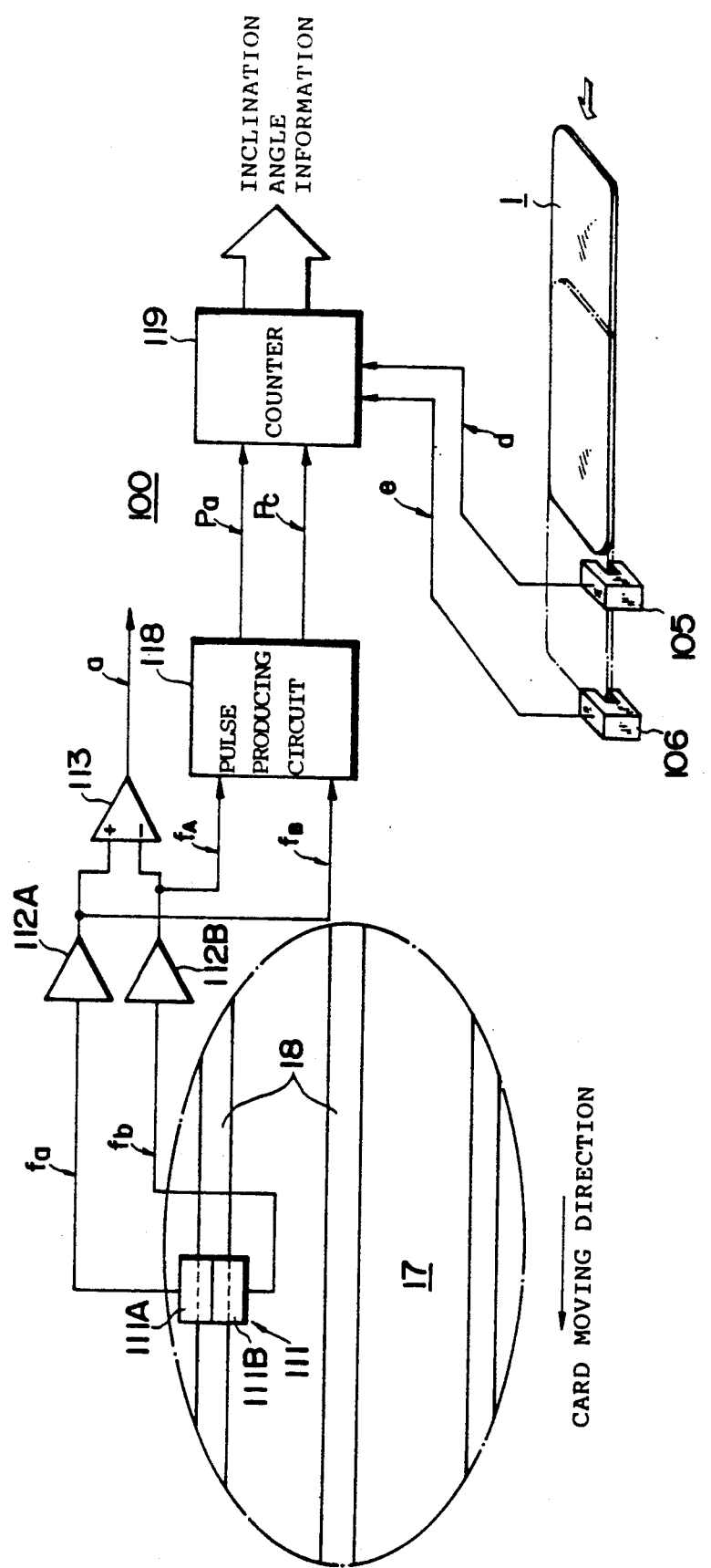
FIGS. 18 and 19 show still another embodiment of an optical card inclination detecting apparatus.
Figure 19:
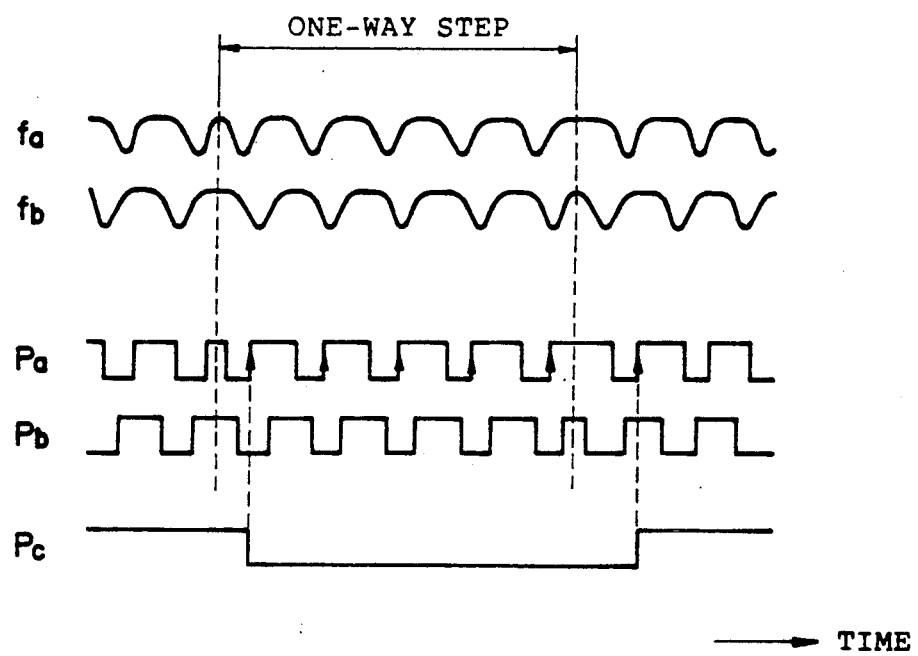

FIGS. 18 and 19 show further another embodiment of an optical card inclination detecting apparatus.

This optical card inclination detecting apparatus comprises: the photo detector 111; amplifiers 112A, 112B; a pulse producing circuit 118; a counter 119; card detecting sensors 105 and 106; etc.

The photo detector 111 is built in the optical system of the optical head 6 and includes a pair of photo diodes 111A and 111B for receiving the reflected light when a light beam for tracking or recording/reproducing was irradiated onto the information recording/recorded portion 16 of the optical card 1. These photo diode receive the reflected light in a range shown in the diagram and produce the output signals $f_a$ and $f_b$ of the levels corresponding to the amount of lights received. The output signals $f_a$ and $f_b$ are respectively amplified by the amplifiers 112A and 112B, and are input to the subtracter 113, by which the difference between the amplified outputs $f_A$ and $f_B$ is calculated, thereby producing the tracking error signal a. The tracking error signal a is given to the tracking servo mechanism (not shown). The tracking servo mechanism drives an actuator of the optical head 6 on the basis of this input signal, thereby controlling the tracking operation.

Therefore, when the optical card 1 is moved together with the card holder 2 by making the tracking servo mechanism operative, the optical head 6 follows the information recording track 17 of the optical card 1 and information is correctly recorded onto or reproduced from the track 17.

According to this embodiment, prior to recording or reproducing information, the optical card 1 is moved by the card holder 2 without making the tracking servo mechanism operative, thereby detecting the inclination angle of the optical card 1. That is, when the optical card 1 is inclined, the optical system of the optical head 6, in other words, the light spot on the information recording portion 16 which is produced by this optical system successively crosses at least one or a plurality of track guides 18 due to the movement of the optical card 1. The output signal of each of the photo diodes 111A and 111B which varies every crossing is taken out and a predetermined signal process is executed.

FIG. 19 shows the output signals $f_a$ and $f_b$ of the photo diodes 111A and 111B. Each time the light spot cross the track guides 18, the signal levels of the output signals $f_a$ and $f_b$ decrease because the reflectance of each track guide 18 is lower than those of the other portions, so that changes occur in these signal levels. A phase difference occurs between these changes of the output signals $f_a$ and $f_b$. The phase of one of the output signals is precedent to the phase of the other output signal depending on which one of the photo diodes 111A and 111B detects early the crossing of the light spot and track guide. For instance, in the case of a signal waveform shown in FIG. 19, it will be understood that the phase of the output signal $f_a$ is precedent to that of the output signal $f_b$ in the region corresponding to the one-way step of the card.

The output signals $f_a$ and $f_b$ are amplified by the amplifiers 112 to be given to the pulse producing circuit 118.

The pulse producing circuit 118 shapes the waveforms of the amplified outputs $f_A$ and $f_B$ of the amplifiers 112A and 112B, thereby producing inclination pulses $P_a$ and $P_b$ and an inclination direction signal $P_c$ as shown in FIG. 19. The inclination pulses $P_a$ and $P_b$ are the signals each having the frequency corresponding to the number of crossing times, i.e., the frequency according to the inclination angle of the optical card 1. Either one of the inclination pulse $P_a$ or $P_b$ is given to the counter 119. On one hand, the inclination direction signal $P_c$ is derived by comparing the phases of the inclination pulses $P_a$ and $P_b$. When the phase of the inclination pulse $P_a$ is precedent to that of the other inclination pulse $P_b$, the signal $P_c$ is set to the low level. On the contrary, when the phase of the inclination pulse $P_b$ is precedent to that of the inclination pulse $P_a$, the signal $P_c$ is set to the high level.

The inclination pulse $P_a$ is given to a counter 119. In response to the input of a count start signal d, the counter 119 starts counting the number of inclination pulses $P_a$. The counter 119 finishes the counting operation in response to the input of a count end signal e. The count start signal d and count end signal e are given by the pair of card sensors 105 and 106. These card sensors are arranged so as to be away from each other by a predetermined distance along the carrying passage of the optical card 1. When the card sensors detect the moving optical card 1 at their positions, respectively, they generate the count start signal d and count end signal e as the detection outputs.

Therefore, the direction of the inclination and an inclination angle of the optical card 1 can be known by inputting the inclination direction signal $P_c$ and count value of the counter 119 as inclination angle information to, e.g., a microprocessor.

The above-mentioned optical card inclination detecting operation is executed in the steps in which the optical card 1 is inserted into the card inserting port 11 and held to the card holder 2 and the card holder 2 is forwardly carried. After completion of the detection of the inclination angle of the optical card, the position of the optical card 1 is obviously corrected with use of the detected inclination angle.

Figure 20:
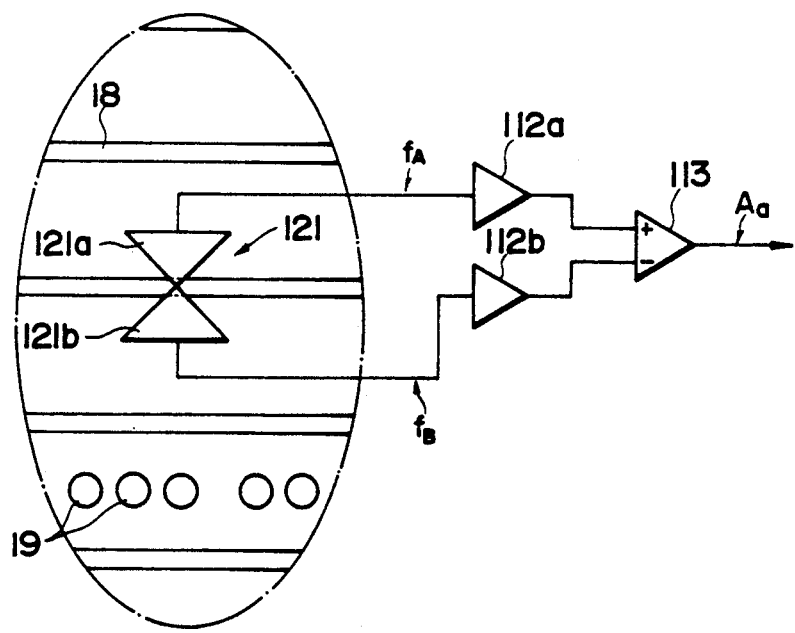
FIGS. 20 to 23 show an embodiment of a tracking error detecting apparatus.

FIG. 20 shows a characteristic portion of the tracking error detecting apparatus according to the embodiment of the invention. This diagram shows the relation between a photo detector 121 comprising photo diodes and the image of the optical card 1. This image is produced by irradiating a light beam onto the optical card 1 having the track guides 18 and by leading the reflected light to the photo detector 121 by the light receiving optical system.

The photo detector 121 in the example shown in the diagram comprising photo diodes and has two-split light receiving portions 121a and 121b having the same isosceles triangular shape. These light receiving portions are point symmetrically arranged with respect to a vertex of the isosceles triangles. The photo sensing signals $f_A$ and $f_B$ from the light receiving portions 121a and 121b are transmitted to the differentiating circuit or subtracter 113 through amplifiers 112a and 112b, respectively. Thus, a tracking error signal $A_a$ is produced. Reference numerals 18 and 19 also denote the images of the track guides and pits.

Figure 21:
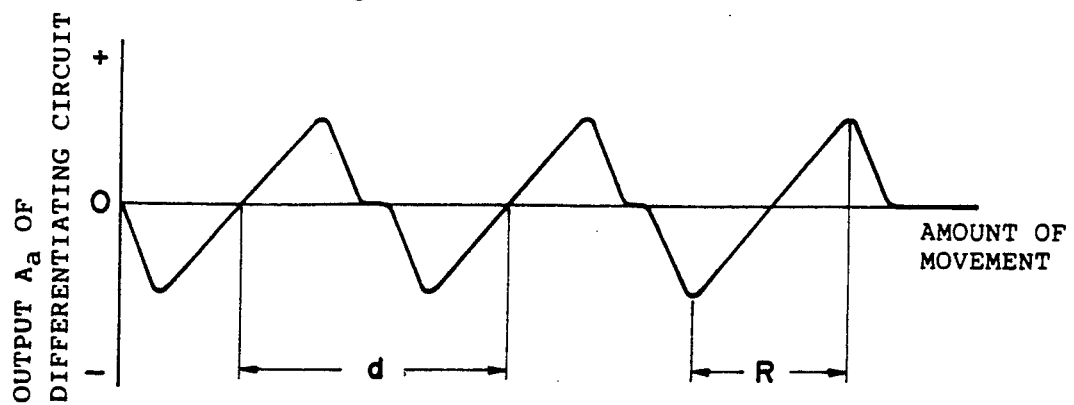
Figure 27:
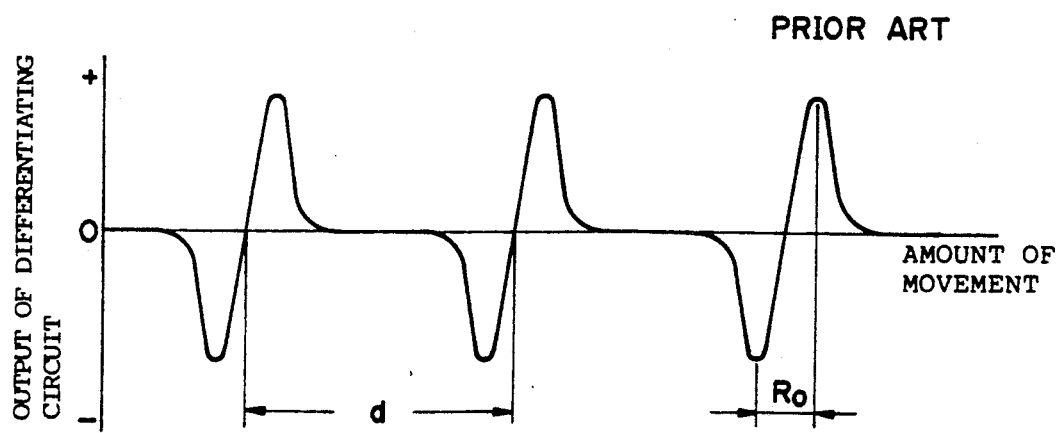
FIG. 27 is a waveform explanatory diagram showing a track error signal generated when an image of a plurality of tracking guides continuously crosses a photo detector in FIG. 26.

FIG. 21 shows the track error signal $A_a$ which is generated when the photo detector 121 continuously crosses the image 18 of a plurality of track guides in the direction perpendicular to the longitudinal direction of the track guides. In the diagram, d represents the distance between the adjacent track guides 18 and R indicates a dynamic range of the track error signal $A_a$. It will be understood from this graph that the dynamic range R in this embodiment is larger than the dynamic range $R_0$ (refer to FIG. 27) in the conventional example and is large enough to be compared with the distance d between the adjacent track guides.

Figure 22:
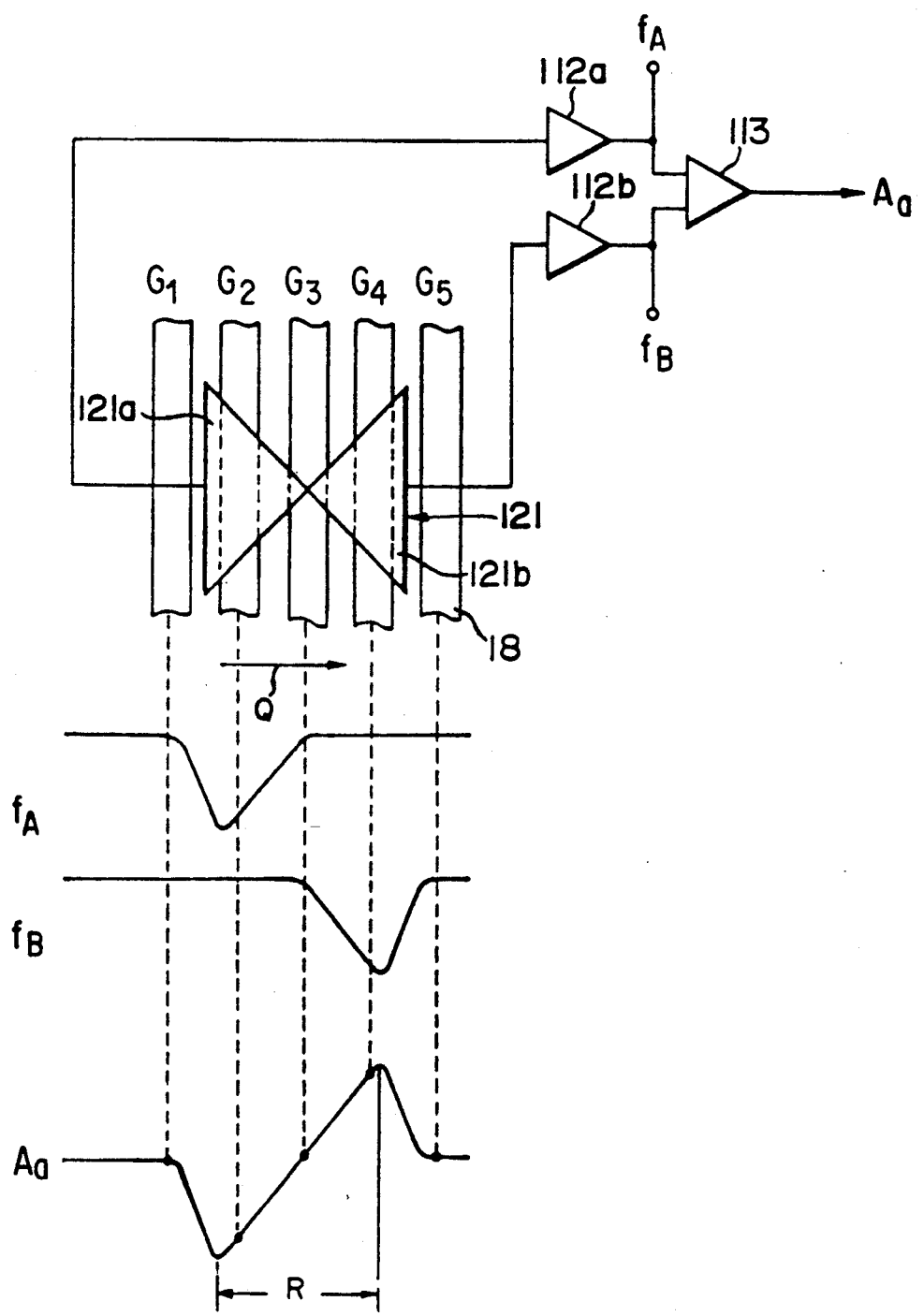

FIG. 22 shows the principle of the generation of the track error signal $A_a$ shown in FIG. 21. In FIG. 22, $G_1$, $G_2$, ---, $G_5$ denote relative positions of the image 18 of the track guides to the photo detector 121 when the track guide image 18 moves in the direction of an arrow Q. In this case, the track error signal $A_a$ is given as a differential output between the amplified output $f_A$ of the light receiving portion 121a and the amplified output $f_B$ of the other light receiving portion 121b. The dynamic range R of the track error signal $A_a$ is so larger that can be compared with a width of the track guide.

Figure 23:
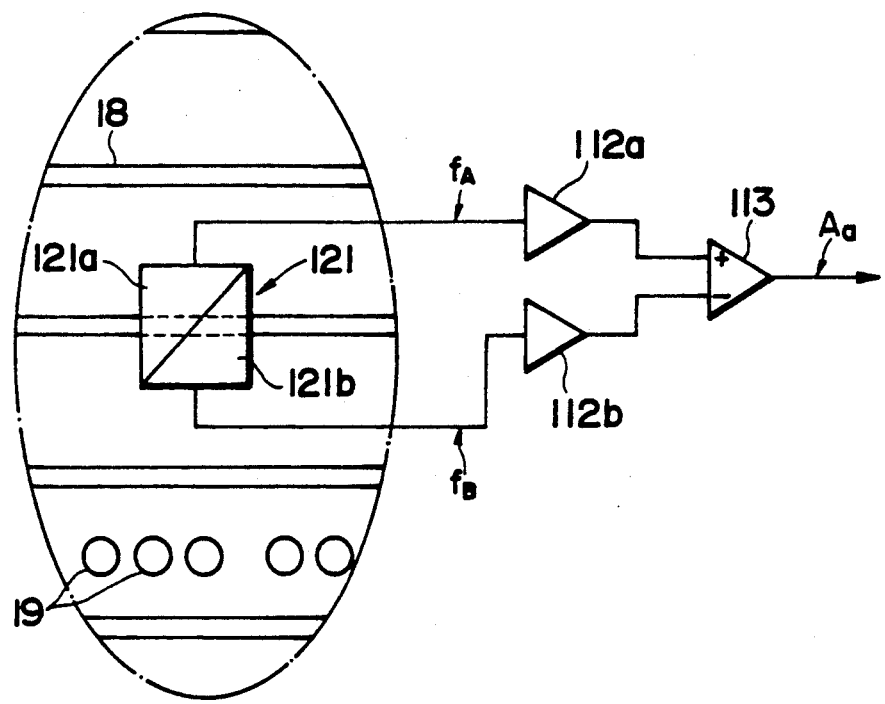
Figure 24:
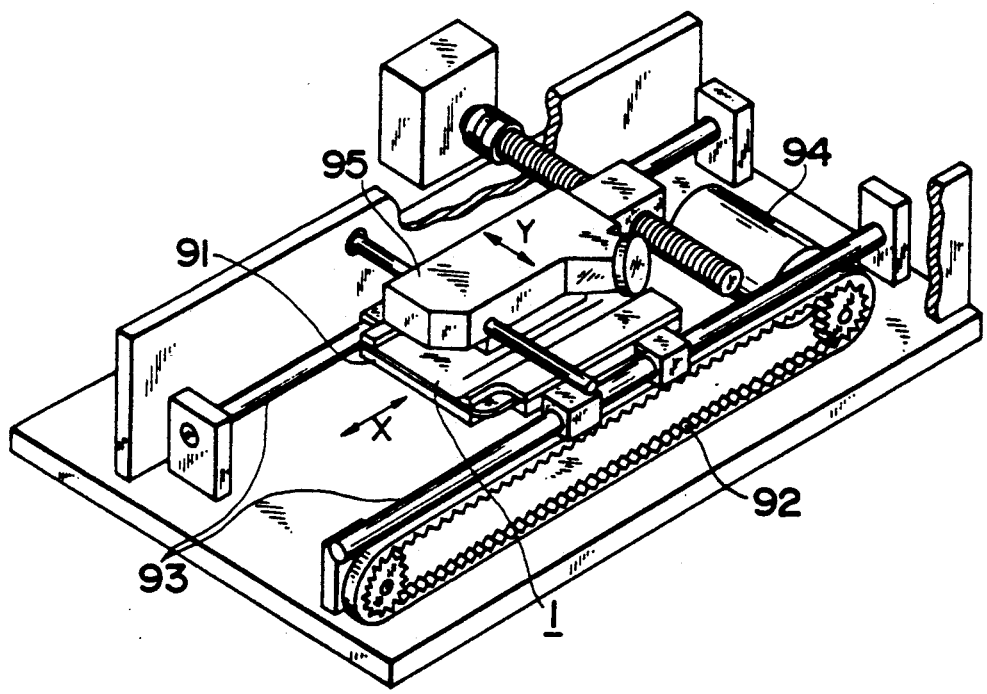
FIG. 24 is a perspective view showing a conventional optical card processing apparatus.
Figure 25:
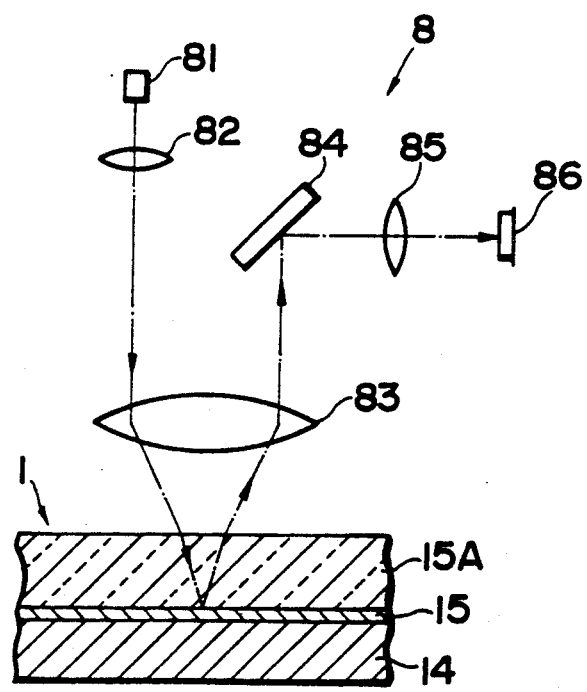
FIG. 25 is an explanatory diagram showing a whole schematic arrangement of a conventional tracking error detecting apparatus.
Figure 26:
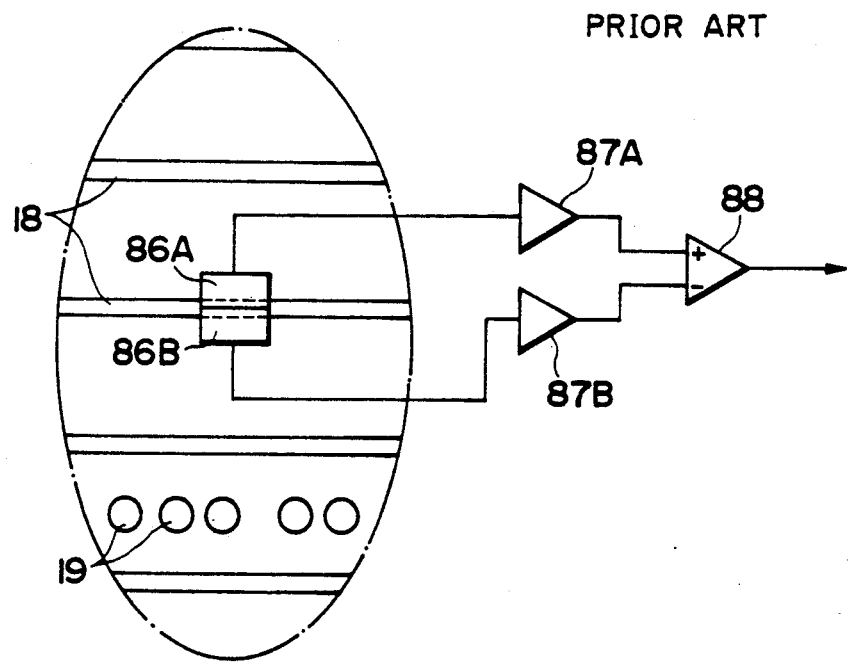
FIG. 26 is an explanatory diagram showing the main section of the conventional tracking error detecting apparatus.

FIG. 23 shows another embodiment of the invention. The photo detector 121 in this embodiment includes two-split light receiving portions 121a and 121b each having the same right-angled triangular shape. These light receiving portions are arranged in the opposite directions so as to confront the oblique side of the right-angled triangles. According to this embodiment, there is an advantage such that even if a microdefect occurred on a track guide upon manufacturing of an optical card, the noise of the track error signal $A_a$ decreases because there is a large overlap portion between the photo detector 121 and the track guide image 18 under the no-tracking-error condition.

On the other hand, the shape of each of the light receiving portions 121a and 121b of the photo detector 121 is not limited to the foregoing shape but can be also set to other shape such that at least one side of the outer shape of each light receiving portion is set obliquely to the image 18 of the track guides which is formed on the photo detector 121.

Now, assuming that the track guide image 18 is located at the center of the photo detector 121, since the sizes of the images on the light receiving portions 121a and 121b coincide, the differential output of the differentiating circuit 113 is zero and no track error signal $A_a$ is generated. On the other hand, if the position of the track guide image 18 is deviated in the direction of either one of the light receiving portions due to a shock or the like during the operation, a difference occurs between the levels of the photo sensing signals $f_A$ and $f_B$ because the reflectance of the track guides 18 differs from those of the other portions, so that the differentiating circuit 113 outputs the track error signal $A_a$. In this case, since the dynamic range R of the track error signal $A_a$ is sufficiently largely set, the detection width of the tracking error is wide and the tracking control is maintained for a shock or the like.

In addition, since the dynamic range R is wider to be compared with distance d between the adjacent track guides 18, the tracking pull-in operations at the start of the tracking control and in the track jumping operation can be easily certainly realized.

What is claimed is:

1. An optical card inclination detecting apparatus comprising:
    a card holder having a card holding portion for holding an optical card which is provided on a surface thereof with a plurality of parallel information containing tracks;
    a card transfer means for moving said card holder in opposing directions which are substantially parallel to the direction of said tracks provided on a card held by said card holding portion;
    an optical head, supported to be movable in a direction perpendicular to the movement direction of said card holder and comprising: a light projecting optical system for projecting light onto said surface of said card, photodetecting means for receiving light reflected from said surface of said card and for generating a tracking error signal on the basis of a signal representing the received light, the tracking error signal representing a deviation of the light projected onto a card from a track on the card, and an actuator means for adjusting said light projecting optical system for tracking control;
    servo-control means responsive to said tracking error signal for producing a tracking drive signal based on said tracking error signal to drive said actuator means such that the light projected onto said card follows along the track provided on said card;
    means for detecting said tracking drive signal produced in said servo-control means while said card holder is being moved in at least one of said opposing directions by said card transfer means and said servo-control means is executing a tracking operation; and means for generating a signal representing a change in said tracking drive signal detected by said detecting means, said change in the tracking drive signal representing an angle of inclination of said card held by said card holder relative to a direction of motion of said card holder.

2. An apparatus according to claim 1, wherein said signal generating means includes a differentiator for differentiating the tracking signal to produce a signal representing the inclination angle.

3. An apparatus according to claim 1, wherein said signal generating means comprises:

card sensors for detecting a passage of the optical card at two points which are separated from each other by a predetermined distance;

means for sampling a value represented by the tracking signal in response to signals generated from said card sensors when the passage of the optical card at each point is detected; and means for calculating a difference between the values sampled by said sampling means with respect to said two points to output a signal indicative of the inclination angle.

4. An apparatus according to claim 1, wherein said signal generating means includes means for detecting a current output by said servo-control means and fed to said actuator means, said current representing said tracking signal.

5. A method for detecting optical card inclination comprising the steps of:

holding an optical card with a card holder, said card having on a surface thereof a plurality of parallel information containing tracks;

moving said holder relative to an optical head in opposing directions which are substantially parallel to the direction of said tracks provided on said held card;

using said optical head to: project light onto said surface of said card, receive light reflected from said surface of said card; generate a tracking error signal on the basis of a signal representing the received light, the tracking error signal representing a deviation of the light projected onto a card from a track on the card, and adjust said projected light for tracking control;

producing a tracking drive signal based on said tracking error signal which is used by said optical head to adjust said projected light such that the light projected onto said card follows along the track provided on said card;

detecting said tracking drive signal produced while said card is being moved in at least one of said opposing directions and said projected light is being adjusted by said optical head based on said tracking drive signal; and generating a signal representing a change in said tracking drive signal, said change in the tracking drive signal representing an angle of inclination of a card held by said card holder relative to a direction of motion in said opposing directions.

6. A method as in claim 5, further comprising the step of adjusting an angle of inclination of said card held by said card holder in response to said signal representing a change in said tracking drive signal.

* * * * *

UNITED STATES PATENT AND TRADEMARK OFFICE
CERTIFICATE OF CORRECTION

PATENT NO. : 5,179,268
DATED : January 12, 1993
INVENTOR(S) : Kouji Nitto, et al.

It is certified that error appears in the above-identified patent and that said Letters Patent is hereby corrected as shown below: Title page:

Item: [73] Assignee

"Omron Tateisi Electronic Co., Kyoto, Japan " should read
-- Omron Tateisi Electronics Co., Kyoto, Japan--.

Signed and Sealed this

Third Day of January, 1995

Attest:

BRUCE LEHMAN

Attesting Officer     Commissioner of Patents and Trademarks